United States Patent
Bemis et al.

(10) Patent No.: US 6,517,101 B1
(45) Date of Patent: Feb. 11, 2003

(54) RELEASE ASSEMBLY AND METHOD FOR DEPLOYING A SUPPLEMENTAL RESTRAINT SYSTEM

(75) Inventors: Claude E. Bemis, York, ME (US); Craig Labrie, Dover, NH (US); David McCooey, Dover, NH (US); Gordon Warren, E. Lebanon, ME (US)

(73) Assignee: Textron Automotive Company Inc., Troy, MI (US)

( * ) Notice: Subject to any disclaimer, the term of this patent is extended or adjusted under 35 U.S.C. 154(b) by 0 days.

(21) Appl. No.: 08/906,813

(22) Filed: Aug. 6, 1997

(51) Int. Cl.[7] .................................................. B60R 21/20
(52) U.S. Cl. ..................................................... 280/728.3
(58) Field of Search .............................. 280/728.3, 732, 280/728.2

(56) References Cited

U.S. PATENT DOCUMENTS

| | | |
|---|---|---|
| 3,708,179 A | 1/1973 | Hulten |
| 4,893,833 A | 1/1990 | DiSalvo et al. |
| 4,964,653 A | 10/1990 | Parker |
| 5,060,972 A | 10/1991 | Satoh et al. ................. 280/732 |
| 5,066,037 A | 11/1991 | Castrigno et al. |
| 5,150,919 A | 9/1992 | Sakakida et al. |
| 5,199,739 A | 4/1993 | Fujiwara et al. |
| 5,211,421 A | 5/1993 | Catron et al. |
| 5,451,074 A | 9/1995 | Guitarini |
| 5,458,365 A | 10/1995 | Rogers et al. |
| 5,492,360 A | 2/1996 | Logeman |
| 5,520,410 A * | 5/1996 | Sun ........................... 280/728.3 |
| 5,549,324 A * | 8/1996 | Labrie et al. ............. 280/728.3 |
| 5,651,562 A * | 7/1997 | Hagen et al. ............. 280/728.3 |
| 5,813,693 A * | 9/1998 | Gordon et al. ........... 280/728.3 |
| 5,927,747 A * | 7/1999 | Farrington ............... 280/728.3 |

* cited by examiner

*Primary Examiner*—Peter C. English
(74) *Attorney, Agent, or Firm*—Grossman, Tucker, Perreault & Pfleger, PLLC (57) ABSTRACT

An inflatable restraint deployment system includes a simplified hold-down assembly for fastening an air bag door in a tamper-proof closed position. The deployment system includes an air bag door pivotally supported adjacent an air bag deployment opening in an automobile dashboard and two fasteners that releasably secure the door in a closed position over the air bag deployment opening. The fasteners each include an elongated shaft portion that either extends integrally upward from an air bag canister flange or integrally downward from an air bag door substrate. The fasteners are aligned in the direction of door movement. Each fastener shaft portion extends through one of a pair of fastener holes formed either in the air bag door substrate or in the canister flange. A fastener flange extends outward from around the shaft portion of each fastener and engages a rim that defines one of the fastener holes. Each fastener hole defines an area slightly smaller than the cross-sectional area of the thickest portion of each fastener flange. Either the fastener hole rims or the fastener flanges yield when air bag inflation forces the air bag door to pivot out of the closed position.

7 Claims, 4 Drawing Sheets

RELEASE ASSEMBLY AND METHOD FOR DEPLOYING A SUPPLEMENTAL RESTRAINT SYSTEM

TECHNICAL FIELD

This invention relates generally to supplemental restraint systems for use in motor vehicles and, more particularly, to supplemental inflatable restraint systems which are housed within a vehicle interior trim product behind or below an opening which is closed by a door that opens in response to air bag inflation.

BACKGROUND OF THE INVENTION

Supplemental inflatable restraint systems (SIRSs) require a cover that opens to provide a path through which an air bag may deploy into the passenger compartment as the air bag inflates.

Some of the prior art SIRS covers include air bag doors with hinges that allow the doors to swing open in response to air bag inflation. These doors may be mid-mounted on the front vertical face of an instrument panel as shown in U.S. Pat. No. 3,708,179 or may be mounted on an upper surface of an instrument panel or dash board as shown in U.S. Pat. Nos. 4,946,653 and 4,893,833.

One problem with such prior art systems is that the air bag door edges are positioned where children can pry the door open unless it is firmly fastened in place by interlocking mechanical members. Moreover, even if members are designed to interlock securely enough to preclude occupants from prying the air bag door open, such interlocking members may not predictably release the air bag door promptly enough in response to air bag inflation. In such cases, the door may not fully open and may, as a result, obstruct the air bag as it deploys into the vehicle passenger compartment.

One solution to such problems is set forth in U.S. Pat. No. 5,066,037 in which a flange on the door closure is fit within a U-shaped clamp. In such arrangements the locking flange and clamp must be separately positioned and aligned during the assembly of the supplemental inflatable restraint system.

"Another solution is disclosed in U. S. Pat. No. 5,458,365 in which slotted cylindrical heads on specially-molded probes 26 snap into cylindrical sockets 24 in base members 22 to hold an air bag door closed, but yield and pop out of the sockets when the air bag is deployed. Both the probes 26 and the base members 22 must be specially fabricated by injection molding or similar means."

Another solution, shown in FIGS. 8–15 of U.S. Pat. No. 5,150,919 involves pins 142 fabricated with threaded portions for attachment to threaded door-mounted studs 141. An enlarged head of each of the pins 142 extends through one of apertures 133a in an instrument panel support structure or canister flange. A spring pin 143 may be provided to hold the head of each pin 142 in its respective aperture 133a. Upon deployment, the pins 142 pop out of the holes 133a.

Still another solution is set forth in U.S. Pat. No. 5,451,074 which is assigned to the assignee of the present invention. This patent shows a hold-down cable secured at its lower end to an instrument panel structure and provided at its upper end with an enlarged head, which is fitted into a keyhole slot 38 in an air bag door. In the embodiment of FIGS. 2–5 the cable and head are metal and, upon deployment, cause the slot portion 38b to deform to release the head 50. In the embodiments of FIGS. 6–9, the cable 92 and its head 134 are plastic and designed to deform upon air bag deployment. In each case, the heads and keyhole slots must be specially fabricated.

Each of the above solutions involves the manufacture and assembly of fasteners and support structures, or the formation of specially shaped sockets and receptacles. None of the above solutions can be implemented without fabricating fasteners and other such structures that do not exist in present systems and that would be time-consuming and expensive to engineer.

What is needed is a supplemental inflatable restraint system with a door hold-down assembly that can be manufactured and assembled without the expense of designing and fabricating new parts.

SUMMARY OF THE INVENTION

In accordance with this invention an inflatable restraint deployment system is provided comprising a simplified hold-down assembly that uses simple, commonly available or easily formable fasteners such as rivets and studs to releasably fasten an air bag door in a tamper-proof closed position. The deployment system comprises a hinged air bag door pivotally supported adjacent an air bag deployment opening in an air bag container. The air bag door is pivotally moveable about a hinged edge between a closed tamper-proof position covering the air bag deployment opening and an open, air bag-release position exposing the air bag deployment opening. A door hold-down member is supported in a fixed position adjacent the air bag deployment opening. A fastener hole rim defines a fastener hole in at least one of the air bag door and the door hold-down member. A door hold-down fastener releasably connects the air bag door to the hold-down member. The fastener includes an elongated shaft portion that extends from either the hold-down member or the air bag door through the fastener hole and is aligned with the direction the door would initially move if forced out of the closed position. A first fastener flange extends outward from around the fastener shaft portion. The first fastener flange engages the fastener hole rim to hold the air bag door in the closed position. The fastener has a first fastener cross-sectional area defined by the intersection of the door fastener and a plane extending perpendicular to the shaft portion through the first fastener flange. The fastener hole defines an area smaller than the first fastener cross-sectional area. Because of this, at least one of the fastener hole rim and the first fastener flange must yield when air bag inflation forces the door to pivot out of the closed position. This forced opening either pulls the door loose from the fastener and door hold-down member or pulls the door loose while retaining the fastener from the door hold-down member.

According to one aspect of the present invention, the door hold-down fastener comprises a stud-type fastener integrally extending from the air bag door. The stud-type fastener may be formed with a substrate portion of the air bag door as a single unitary piece.

According to another aspect of the present invention, the door fastener is a stud-type fastener that integrally extends from the door hold-down member. The stud-type fastener may be formed with the hold-down member as a single unitary piece.

According to another aspect of the present invention, the door fastener is a stud-type fastener that integrally extends from the air bag door. The stud-type fastener may be formed with the air bag door or a substrate portion of the air bag door as a single unitary piece.

According to another aspect of the present invention, the first fastener flange is a yielding stud head made of a yielding material such as plastic and the air bag door substrate is made of a non-yielding material such as metal. The first fastener flange may also be non-yielding, requiring that the fastener hole rim be formed in such a way that it will yield to the passage of the non-yielding fastener flange.

According to another aspect of the present invention, the door fastener is a rivet-type fastener and the fastener hole is the first of two fastener holes. The first fastener hole is disposed in said air bag door and the second fastener hole is disposed in the hold-down member. The first and second fastener holes are axially aligned when the air bag door is in the closed position. The rivet shaft portion extends through the first and second fastener holes and the rivet-type fastener includes a second rivet flange in the form of a rivet head that extends outwardly from the shaft portion adjacent the fastener base. The first and second fastener holes are disposed between said first and second fastener flanges. The rivet head engages the rim of one of the first and second fastener holes while the first fastener flange engages the rim of the other of the first and second fastener holes. The rivet may be any one of a number of commercially available rivets, either metal or plastic.

The invention additionally includes a method for releasably securing an air bag door in an inflatable restraint deployment system using a stud-type fastener. According to this method a base end of the elongated shaft portion of the stud-type fastener is connected to one of the hold-down member and the air bag door. When the air bag door is in the closed position the elongated shaft portion extends from the hold-down member parallel to the direction of door opening and is axially aligned with one of the first and second fastener holes. The stud-type fastener may be formed with either the hold-down member or the air bag door substrate as a single unitary piece. During final assembly, the air bag door is pivoted towards its closed position until the fastener hole contacts the stud flange. As the door continues towards its closed position the stud flange is forced to yield and deform as the fastener hole is forced over (or the fastener is forced through). As the door reaches its closed position the fastener hole passes completely over the stud flange allowing the stud flange to return to its approximate pre-deformation configuration. The stud may, alternatively, be formed initially as a hollow or solid cylinder that is heat staked to form the stud flange after the stud is passed through the fastener hole.

The invention additionally includes a method for releasably securing an air bag door in an inflatable restraint deployment system using a rivet-type fastener. According to this method the rivet-type fastener is installed in the hold-down member by moving the air bag door to its closed position and passing the elongated shaft portion through the first and second fastener holes. The rivet is then axially compressed to form the rivet flange at the end of the elongated portion of the rivet opposite the rivet head. The rivet head and rivet flange hold the door substrate and hold-down member together, securing the air bag door in its closed position.

BRIEF DESCRIPTION OF THE DRAWINGS

To better understand and appreciate the invention, refer to the following detailed description in connection with the accompanying drawings.

DETAILED DESCRIPTION OF THE PREFERRED EMBODIMENT

Figure 1:
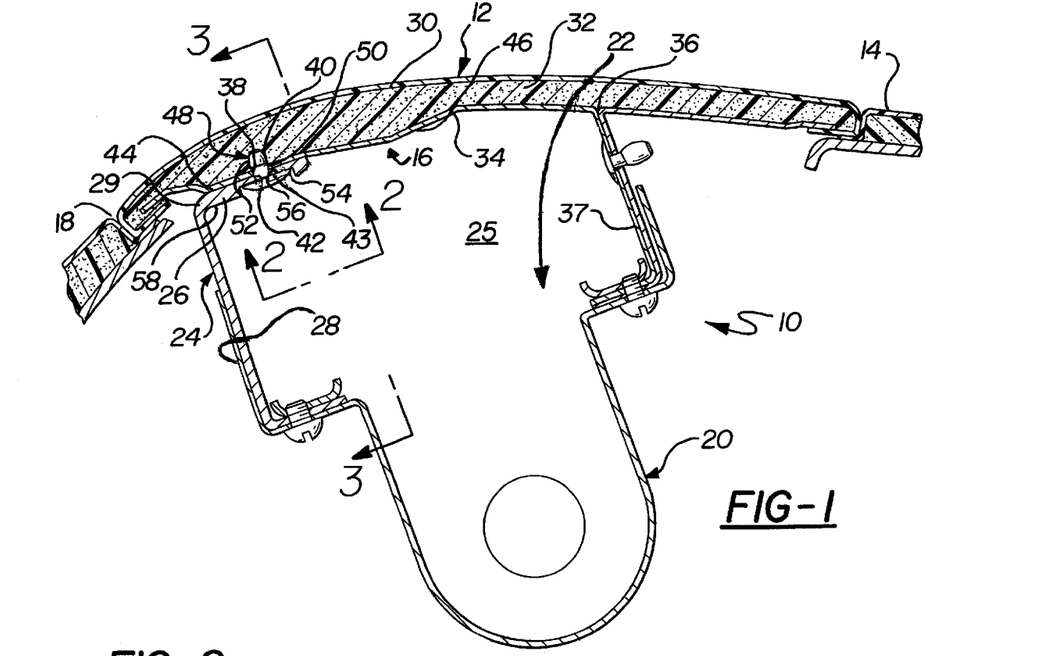
FIG. 1 is a cross-sectional side view of an inflatable restraint deployment system constructed according to a first embodiment of the present invention.

An inflatable restraint deployment system including a simplified hold-down assembly for fastening an air bag door of the inflatable restraint deployment system in a tamper-proof closed position is generally shown at 10 in FIG. 1. Second, third and fourth embodiments are shown at 10a–c in FIGS. 4, 7 and 8, respectively. Reference numerals with the suffix "a" in FIGS. 4–6, "b" in FIG. 7 and "c" in FIG. 8 indicate alternative configurations of elements that also appear in the first embodiment in FIGS. 1–3. Where a portion of the following description uses a reference numeral to refer to the figures, we intend that portion of the description to apply equally to elements designated by numerals with suffixes "a", "b" and "c" (except where indicated otherwise).

In FIGS. 1, 4, 7 and 8, four embodiments of the inflatable restraint deployment system 10 are shown as they would appear with the air bag door 12 in a top mount position. In a top-mount position the air bag door 12 is mounted in the upper surface of an automotive vehicle instrument panel 14 to cover an air bag deployment opening 16 formed through the top surface of a dashboard or instrument panel 14 in a vehicle interior. However, any of these embodiments of the inflatable restraint deployment system 10 could alternatively be formed in an instrument panel surface in a mid-mount position.

As shown in FIG. 1, the air bag deployment opening 16 has a front edge 18 located in underlying relationship to a sloped front windshield (not shown) in a vehicle interior. For purposes of this description, the terms "forward" and "front" will refer to positions relatively close to occupants within the passenger compartment. Conversely, the terms "rearward", "rear" and "back" will refer to positions relatively distant from such occupants. In addition, the term "outward" will refer to the direction of air bag deployment.

The inflatable restraint deployment system 10 includes an air bag housed in an air bag container or canister. A canister constructed in accordance with the invention is shown at 20 in FIG. 1. In other embodiments, any one of a number of other such air bag containers may be used. The canister 20 has an open end 22 mounted adjacent and directed toward the air bag deployment opening 16.

As shown in FIG. 1, a door hold-down member 24 is supported in a fixed position adjacent the air bag deployment opening 16. The hold-down member 24 comprises a hold-down member flange 26 disposed adjacent the open end 22 of the canister 20. The flange 26 extends integrally and perpendicularly from a main portion of the hold-down member 24 that extends along a sidewall 28 of the canister 20. The flange 26 extends from the main portion of the hold-down member 24 toward an interior region 25 of the canister 20. When the air bag inflates, it strikes the flange 26, bending the flange 26 outward along a bending region 29- out of the path of the inflating air bag.

Alternatively, the flange 26 may be designed to extend from the main portion of the hold-down member 24 in a direction away from the canister interior region 25. In the latter case, the hold-down member flange 26 may be designed more rigidly and need not be designed to bend out of the path of an inflating air bag. In other embodiments the door hold-down member 24 may comprise some structure other than an air bag canister component. In other words, the door hold-down member 24 may, for example, comprise portions of an interior trim panel structure, a structural duct, a cross-bar beam, a reinforcement collar, or the like.

As shown in FIG. 1, the air bag door 12 comprises an outer skin 30, an inner foam layer 32 and a rigid substrate 34. The air bag door substrate 34 is pivotally supported along a hinged edge 36 adjacent the air bag deployment opening 16 and is preferably made from a rigid metal material such as aluminum. As shown in FIG. 1, the hinged edge 36 may comprise a simple bend in a rigid panel forming the door substrate 34. The remainder 37 of the panel extends into the air bag canister 20 and attaches to a wall of the canister 20 adjacent the air bag deployment opening 16. Other embodiments may include other types of hinge arrangements known in the art.

The air bag door 12 is pivotally moveable about the hinged substrate edge 36 between a closed tamper-proof position covering the air bag deployment opening 16 and an open air bag-release position exposing the air bag deployment opening 16. FIGS. 1, 4, 7 and 8 show the closed position. Materials used in constructing the door 12 may include those disclosed in U.S. Pat. No. 5,451,074, or any of a number of suitable materials commonly known in the art. U.S. Pat. No. 5,451,074 is assigned the assignee of the present invention and is incorporated into this application by reference.

The air bag door 12 includes a first pair of circular fastener holes, representatively shown at 38 in FIG. 1. Each hole of the first pair of fastener holes 38 extends through the relatively thin substrate portion 34 of the air bag door 12 and is defined by a first fastener hole rim, representatively shown at 40 in FIGS. 1 and 3. The first pair of fastener holes 38 may either be molded into the substrate 34 when the substrate 34 is formed or drilled into the substrate 34 after the substrate 34 is formed.

In other embodiments, there may be only a single "first fastener hole" defined by a single "first fastener hole rim" rather than a first pair of fastener holes 38. Alternatively, there may be three or more "first" fastener holes. In any event the number of "first" fastener holes will at least equal the number of fasteners.

Figure 2:
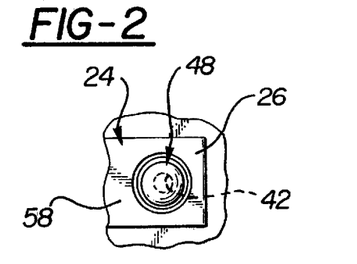
FIG. 2 is a view of a rivet head and inner canister flange portion of the inflatable restraint deployment system of FIG. 1 taken along line 2—2 of FIG. 1.

The hold-down member flange 26 includes a second pair of circular fastener holes, representatively shown at 42 in FIGS. 1 and 2. Each hole of this second pair of fastener holes 42 extends through the hold-down member flange 26 and is defined by a second fastener hole rim 43. As is best shown in FIG. 1, each hole of the second pair of fastener holes 42 is axially aligned with and concentrically abuts one of the holes of the first pair of fastener holes 38 when the air bag door 12 is in the closed position. In other words, with the air bag door 12 in the closed position, an upper surface 44 of the hold-down member flange 26 contacts a portion of a lower surface 46 of the air bag door substrate 34. In this position each hole of the first pair of fastener holes 38 is in concentric, axial alignment with a corresponding hole of the second pair of fastener holes 42. The second pair of fastener holes 42 may either be molded into the hold-down member flange 26 when the flange 26 is formed or drilled into the flange 26 after the flange 26 is formed.

In other embodiments, there may be only a single "second fastener hole" defined by a single "second fastener hole rim" rather than a second pair of fastener holes 42. Alternatively, there may be three or more "second" fastener holes. In any event the number of "second" fastener holes will at least equal the number of fasteners.

The first and fourth embodiments of the deployment system 10 also include two spaced-apart rivet-type door hold-down fasteners as is representatively shown at 48 in FIGS. 1–3 and 8. In both embodiments, the fasteners 48 and 48c can be designed to remain with either the air bag door 12 or the hold-down member 24 when the door 12 is forced open.

Figure 3:
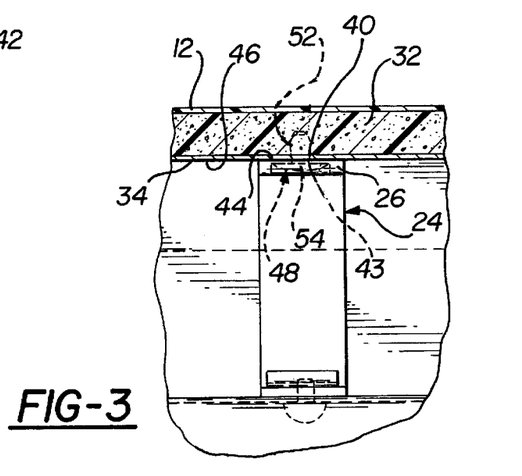
FIG. 3 is a cross-sectional view of the inflatable restraint deployment system of FIG. 1 taken along line 3—3 of FIG. 1.

"In both the first and fourth embodiments the two fasteners 48 are spaced laterally adjacent the front edge of the air bag door 12. The rivet-type fasteners 48 each have an elongated cylindrical shaft portion 50 integrally extending between first 52 and second 54 rivet flanges. The first 52 and second 54 rivet flanges are respectively defined by a radially-extended section of the shaft portion 50 and a large diameter rivet head 54, as is best shown in FIG. 3. The first 52 and second 54 rivet flanges extend outward from and around each rivet shaft portion 50. The first rivet flange 52 is formed by axial compression of the shaft portion 50 while the rivet head 54 is formed with the shaft portion 50 as a single unitary piece by molding or stamping."

In other embodiments, there may be only a single rivet-type hold-down fastener 48. There may also be three or more such fasteners if required to firmly secure the air bag door 12 in its closed position.

Figure 8:
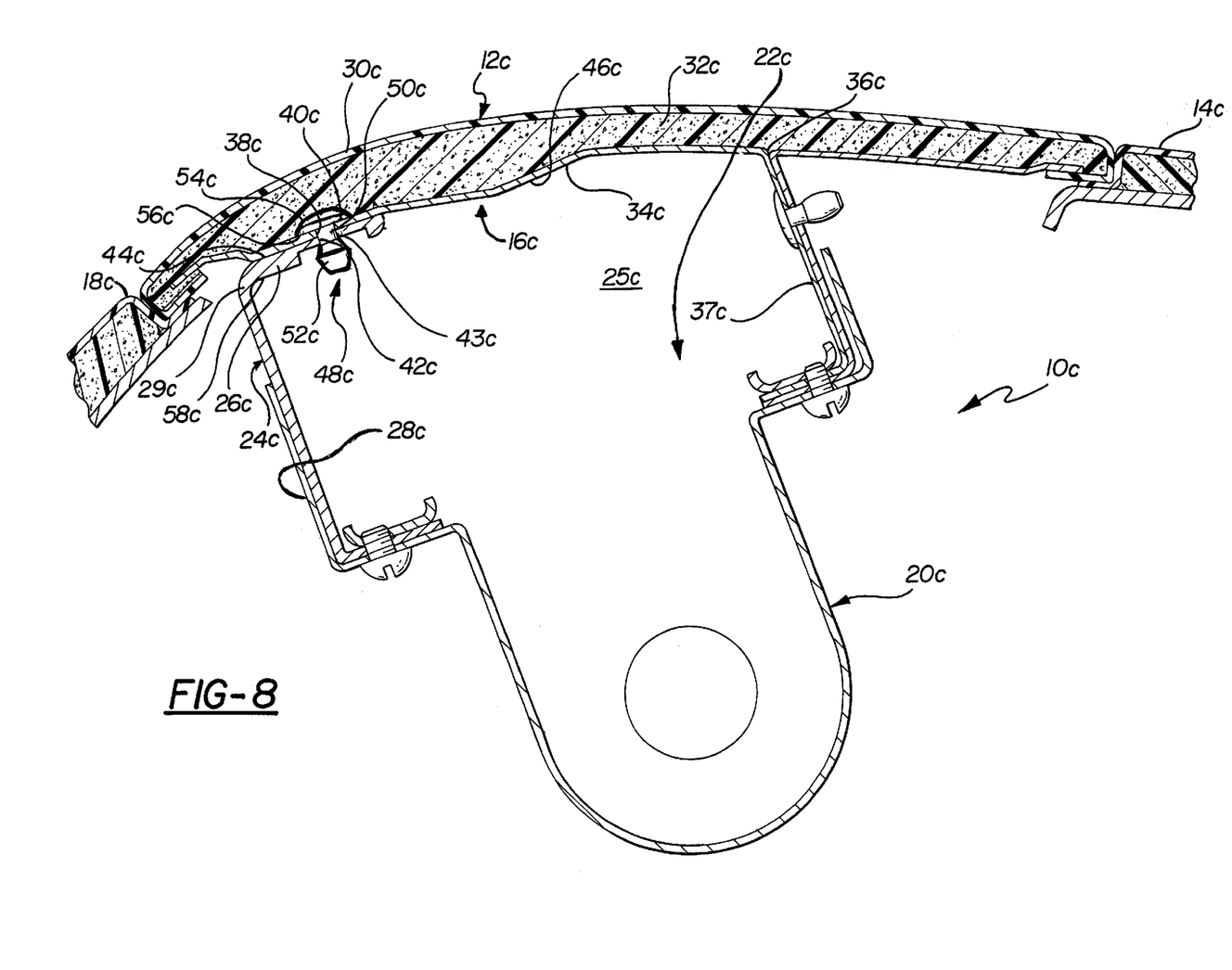
FIG. 8 is a cross-sectional side view of an inflatable restraint deployment system constructed according to a fourth embodiment of the present invention.

As shown in FIGS. 1 and 8, the first rivet flange 52 of each fastener 48 comprises a radially-extending outward swelling along the elongated rivet shaft portion 50 produced by axially compressing the shaft portion 50. The swelling is generally greatest at the approximate midpoint of the rivet shaft portion 50. Therefore, the largest rivet shaft diameter and cross-sectional area are found at the approximate midpoint of the shaft portion 50 of each rivet-type fastener 48.

Each rivet-type fastener 48 has a first rivet cross-sectional area defined by the intersection of each rivet-type fastener 48 and a plane extending perpendicular to the rivet shaft portion 50 through the approximate midpoint of the rivet shaft portion 50 where the first rivet flange 52 has its greatest diameter.

Each hole of the first pair of fastener holes 38 in the first embodiment, and the second pair of fastener holes 42c in the fourth embodiment, defines an area that is slightly smaller than the first rivet cross-sectional area of each rivet-type fastener 48. In other words, the cross-sectional area of each rivet-type fastener 48 at the widest point of its first rivet flange 52, is greater than the area defined by each fastener hole 38 (first embodiment), and 42c (fourth embodiment)

Because each fastener hole 38, 42c defines an area that is smaller than the first rivet flange 52 of each rivet-type fastener 48, the fastener hole rims 40, 43c and/or the first rivet flange 52 of each rivet-type fastener 48 must yield to the forced extraction of the first rivet flanges 52 when the door 12 is opened.

In other embodiments, the increase in rivet flange circumference that the fastener holes 38, 42c encounter upon door opening may be more abrupt. This abrupt increase would require more force to open the air bag door 12. The more abrupt change in circumference may take the form of a lip or detent, rather than a gradual swelling, where the shaft portion 50 expands radially into the rivet flange 52.

As shown in FIGS. 1–3 and 8, the second fastener flange 54 of each rivet-type fastener 48, i.e., each rivet head 54, extends radially outward from around the elongated shaft portion 50 of each rivet-type fastener 48. As shown in FIGS. 1 and 8, each rivet head 54 has a domed shape with a flat, washer-shaped engagement surface 56 that extends perpendicularly and radially outward from around the elongated shaft portion 50 of the rivet-type fastener 48.

Each rivet head 54 has an outer diameter greater than each of the holes of, in the first embodiment, the second pair of fastener holes 42, and in the fourth embodiment, the first pair of fastener holes 38c. Consequently, the cross-sectional area of each rivet-type fastener measured at its rivet head 54 is greater than the area defined by the holes of, in the first embodiment, the second pair of fastener holes 42, and in the fourth embodiment, the first pair of fastener holes 38c.

In the first embodiment, the shaft portion 50 of each rivet-type fastener 48 extends upward through a hole of the second pair of fastener holes 42 with each flat rivet head engagement surface 56 abutting a lower surface 58 of the flange 26 as representatively shown in FIGS. 1–3. In the fourth embodiment, the shaft portion 50c of each rivet-type fastener 48c extends downward through a hole of the first pair of fastener holes 38c with each flat rivet head engagement surface 56c abutting an upper surface of the door substrate 34c as is representatively shown in FIG. 8. The relatively larger diameter of each rivet head 54 causes each rivet head 54 to engage, in the first embodiment, the lower surface of the flange 26 surrounding each hole of the second pair of fastener holes 42. In the fourth embodiment, each rivet head 54 engages the upper surface of the door substrate 34c surrounding each hole of the first pair of fastener holes 38c. As shown in FIGS. 1–3, in the first embodiment, the rivet heads 54 may be counter-sunk into the lower surface 58 of the flange 26 which reduces the thickness of the flange 26 engaged by the rivet head 54.

The elongated shafts 50 of the rivet-type fasteners 48 protrude, in the first embodiment, upward and outward from the first pair of fastener holes 38 toward the air bag door 12. In the fourth embodiment the rivet-type fasteners protrude inward and downward from the second pair of fastener holes 42c and away from the air bag door 12c. In the first embodiment, when the air bag door 12 is in the closed position, the elongated shaft portion 50 of each rivet-type fastener 48 is axially aligned with a hole of the first pair of fastener holes 38. In the fourth embodiment, the shaft portion 50 of each fastener 48 is axially aligned with a hole of the second pair of fastener holes 42c. In other words, the rivet shafts 50 extend in a direction parallel to the direction the door 12 would initially move if forced out of the closed position by air bag inflation.

In the first embodiment, upon air bag deployment, the mechanism facilitating separation of the air bag door 12 from the door hold down member 24 varies according to the design and materials selected for the door hold down member 24, fastener 48, and air bag door substrate 34. Where the flange 26 of the door hold down member 24 is designed towards an interior region 25 of the and must bend outward along bending region 29 out of the path of the inflating air bag, the preferred material of the door hold down member 24 is plastic (e.g., a flexible thermoplastic olefin elastomer) rather than metal to facilitate easier bending. Where plastic is used for the door hold down member, the preferred material for the fastener 48 and the air bag door substrate 34 is metal to facilitate an obvious weakened link in the system (i.e., the plastic). By virtue of the plastic having less yielding strength than metal given similar cross sectional thicknesses, during air bag deployment it will ordinarily deform before the metal will deform. In this manner, upon air bag deployment the second fastener hole rim 43 of the second fastener hole 42 in the flange 26 of the door hold down member 24 yields to the forced extraction of the second rivet flange, or rivet head, 54 when the air bag door 12 is opened. Thus, the fastener 48 remains attached to the air bag door 12.

Alternatively, when the flange 26 of the door hold down member 24 is designed to extend in a direction away from the interior region 25 it does not have to bend out of the path of the inflating air bag and thus may be designed more rigidly and out of metal rather than plastic. In this manner, to facilitate a weakened link in the system, the fastener 48 is made of plastic. Upon air bag deployment, the first rivet flange 52 of the fastener 48 yields to the forced extraction of the first fastener hole rim 40 of the air bag door 12 when the air bag door 12 is opened. Thus, the fastener 48 remains attached to the flange 26 of the door hold down member 24.

Conversely, rather than designing the fastener 48 to be made of plastic, the air bag door substrate 34 could be made of plastic while the fastener 48 and the door hold down member are made of metal. In this scenario, upon air bag deployment, the first fastener hole rim 40 of the first fastener hole 38 in the air bag door substrate 34 yields to the forced extraction of the first rivet flange 52 when the air bag door 12 is opened. Thus, the fastener 48 remains attached to the flange 26 of the door hold down member 24.

Lastly, it may also be possible to rely on the yielding of more than one system member to facilitate separation of the air bag door 12 from the door hold down member 24. For instance, it may be possible to design the fastener 48 and air bag door substrate 34 from plastic while keeping the door hold down member 24 made of metal. In this manner, upon air bag deployment, the first fastener hole rim 40 of the first fastener hole 38 in the air bag door substrate 34 and the first rivet flange 52 of the fastener 48 both may yield to the forced extraction of the first rivet flange 52 when the air bag door 12 is opened.

Similar to the first embodiment, in the fourth embodiment the mechanism facilitating separation of the air bag door 12 from the door hold down member 24 varies according to the design and materials selected for the door hold down member 24, fastener 48, and air bag door substrate 34. Given selection of design and materials similar to the first embodiment, the mechanisms facilitating separation of the air bag door 12 from the hold down member 24 will be similar.

In practice, according to the first and fourth embodiments, each rivet-type fastener 48 is installed by first moving the air bag door 12 to its closed position with the first 38 and second 42 pairs of fastener holes in axial alignment. The elongated rivet shaft portion 50 of each rivet-type fastener 48 is then passed through one of the holes of the first pair of fastener holes 38 and the corresponding hole of the second pair of fastener holes 42. The shaft portion 50 of each rivet-type fastener 48 is pushed through these holes until each rivet-type fastener 48 is in a fully inserted position with each rivet head 54 contacting, in the first embodiment, the hold-down member 24, and in the fourth embodiment, the air bag door substrate 34c. With each rivet-type fastener 48 in its fully inserted position, its elongated shaft portion 50 protrudes outward from the fastener holes 38, 42.

The rivet-type fasteners 48 are secured in their fully inserted positions by axially compressing the shaft portion 50 of each fastener 48. Axial compression forms the rivet flange 52 of each fastener through radial plastic deformation of the shaft portion 50 of each fastener 48. The axial compression may be accomplished using any one of a number of different rivet crimping tools commonly known in the art. By sandwiching the door substrate 34 and hold-down member 24 between the rivet heads 54 and rivet flanges 52 in this manner, the air bag door 12 is secured in its closed position. After installing the rivets 48, the hold-down member 24 is attached to the 20.

Orientation of the rivet-type fasteners 48 relative to the first and fourth embodiments becomes important depending upon when in the assembly process the air bag door substrate 34 and door hold down member 24 are joined with the fastener 48. If the air bag door substrate 34 and the door hold down member 24 are joined with the fastener 48 before the application of the outer skin 30 and inner foam layer 32 to the air bag door substrate 34 either embodiment may be used. However, if the air bag door substrate 34 and the door hold down member 24 are joined with the fastener 48 after the application of the outer skin 30 and inner foam layer 32 to the air bag door substrate 34, only the first embodiment may be used without causing damage to the outer skin 30 and inner foam layer 32. By the method of the fourth embodiment, axial compression of the shaft portion 50 of the fastener 48 after the air bag door substrate 34 and the door hold down member are joined becomes undesirable given the need to first penetrate the outer skin 30 and inner foam layers 32.

Figure 4:
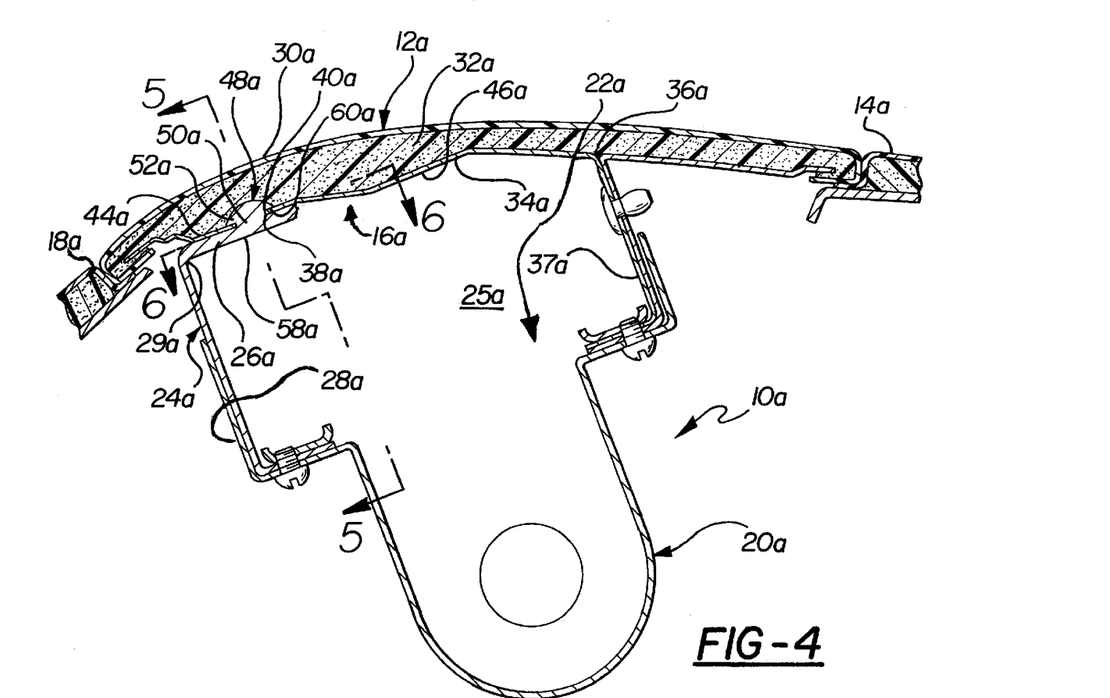
FIG. 4 is a cross-sectional side view of an inflatable restraint deployment system constructed according to a second embodiment of the present invention.
Figure 5:
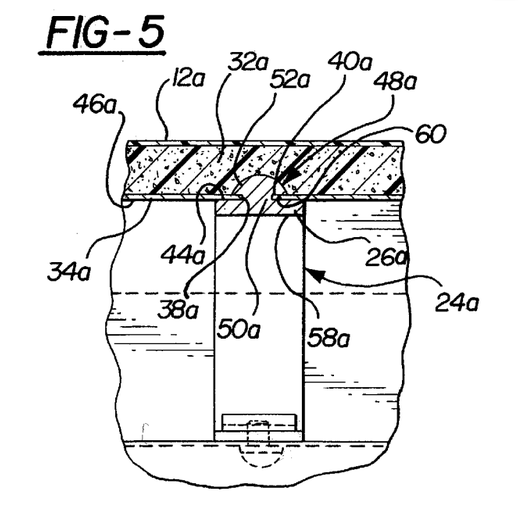
FIG. 5 is a cross-sectional view of the inflatable restraint deployment system of FIG. 4 taken along line 5—5 of FIG. 4.
Figure 6:
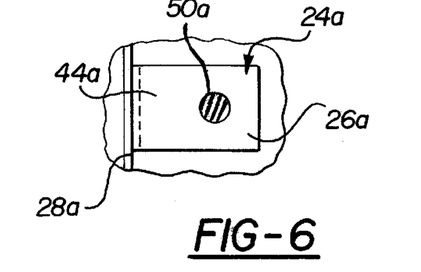
FIG. 6 is a view of a stud and door substrate portion of the inflatable restraint deployment system of FIG. 4 taken along line 6—6 of FIG. 4.
Figure 7:
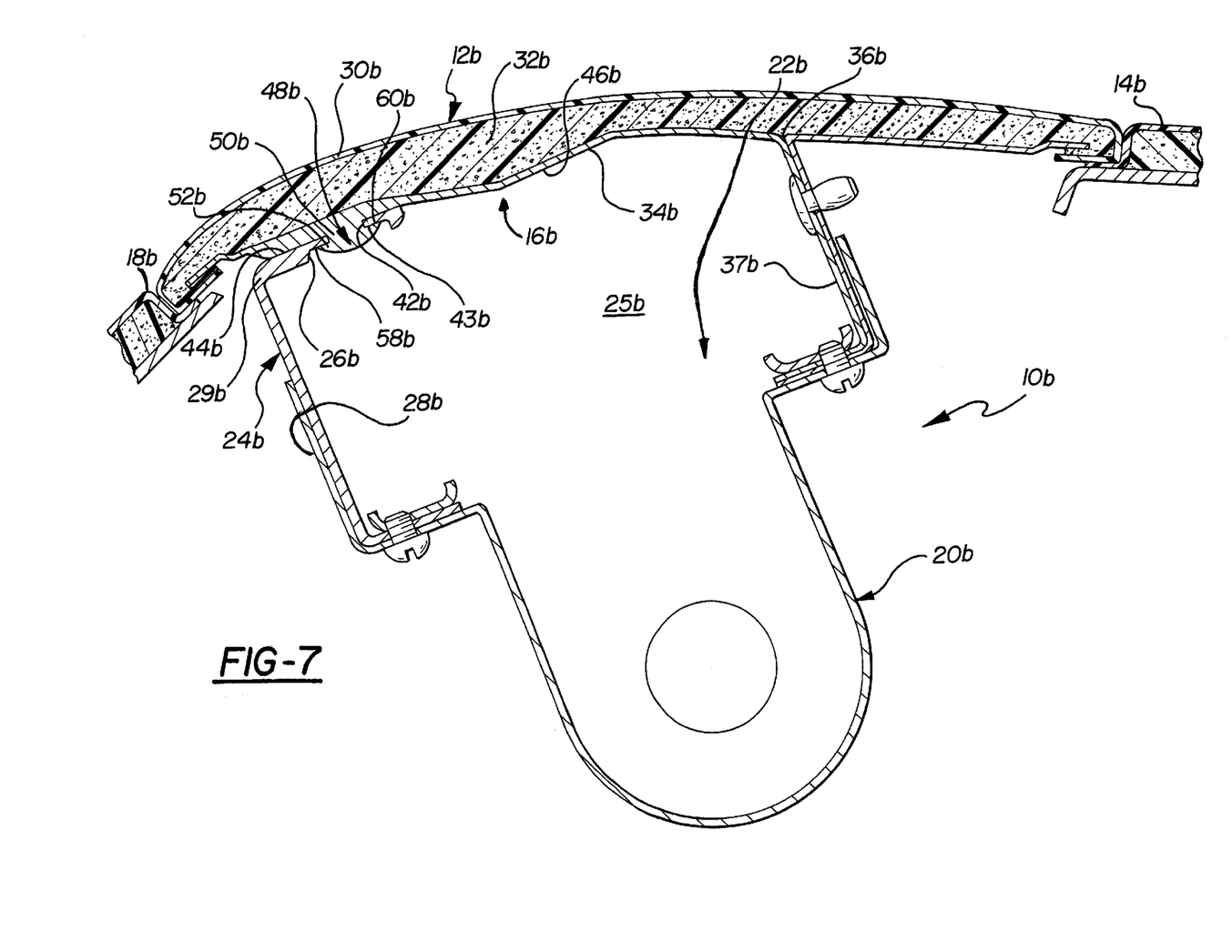
FIG. 7 is a cross-sectional side view of an inflatable restraint deployment system constructed according to a third embodiment of the present invention.

The second and third embodiments of the inflatable restraint deployment system 10a, 10b each include two stud-type door hold-down fasteners, representatively shown at 48a in FIGS. 4 and 5 and 48b in FIG. 7, rather than rivet-type fasteners 48 as described above. The second and third embodiments differ primarily in the positioning of the stud-type fasteners 48a, 48b. In the second embodiment, the stud-type fasteners 48a are fixed to and remain with the hold-down member 24a when an inflating air bag forces the air bag door 12a open. In the third embodiment, the fasteners 48b are fixed to and remain with the air bag door 12b when the door 12b is forced open.

"In the second embodiment shown in FIGS. 4 and 5, the stud-type fasteners 48a or "studs" 48a are injection molded of plastic with the hold-down flange 26a as a single unitary piece and are laterally spaced along the hold-down member flange 26a adjacent the front edge of the air bag door 12a. However, the studs 48a may, alternatively, be screwed into the hold-down member flange 26a or fastened securely by any one of a number of other methods commonly employed in the art."

"As shown in FIG. 7, in the third embodiment, the stud-type fasteners 48b, or "studs" 48b, are injection molded of plastic with the door substrate 34b as a single unitary piece and are laterally spaced along the door substrate 34b adjacent the front edge of the air bag door 12b. However, the studs 48b may, alternatively, be screwed into the door substrate 34b, which may be made of plastic, or fastened securely by any one of a number of other methods commonly employed in the art."

In other embodiments, there may only be a single stud-type hold-down fastener 48a, 48b. There may also be three or more such fasteners if required to firmly secure the air bag door 12a, 12b in its closed position.

"Each stud 48a, 48b has a cylindrical shaft portion 50a, 50b integrally extending, in the second embodiment, from the upper hold-down member flange surface through one of the holes of the first pair of fastener holes 38a. In the third embodiment the stud shaft portion 50b integrally extends from a lower surface of the door substrate and through the second pair of area of fastener holes 42b. Each stud 48a, 48b is aligned parallel with the direction the door 12a, 12b would initially move if forced out of the closed position by air bag inflation. A stud flange 52a, 52b extends outward from around the shaft portion 50a, 50b of each stud 48a, 48b. In the second embodiment, stud flange 52a engages one of the rims 40a defining one of the holes of the first pair of fastener holes 38a. In the third embodiment, stud flange 52b engages one of the rims 43b defining one of the holes of the second pair of fastener holes 42b. In the second and third embodiments, as in the first embodiment, the studs 48a, 48b engage the fastener hole rims 40a, 43b to hold the respective air bag doors 12a, 12b in their respective closed positions. This prevents passenger compartment occupants from accidentally opening or intentionally tampering with the air bag assemblies installed beneath the doors 12a, 12b."

The stud flange 52a, 52b of each stud 48a, 48b has a domed shape with a flat, washer-shaped engagement surface 60a, 60b that extends perpendicularly and radially outward from around the shaft portion 50a, 50b of each stud 48a, 48b. Each stud 48a, 48b has a first stud cross-sectional area defined by the intersection of the stud 48a, 48b and a plane extending perpendicular to the stud shaft portion 50a, 50b through the stud flange 52a, 52b at its widest point, i.e., the engagement surface 60a, 60b.

Each hole of the first pair of fastener holes 38a (second embodiment) and the second pair of fastener holes 42b (third embodiment) defines an area that is slightly smaller than the first stud cross-sectional area of each stud 48a, 48b. The domed shape of each stud flange 52a, 52b; or stud "head" 52a, 52b; and the thickness of the flange 26a and the air bag door substrate 34b cause the stud heads 52a, 52b to yield rather than the fastener hole rims 40a, 43b as the rims 40a, 43b pass over the stud shaft portion 50a, 50b of each stud 48a, 48b as the air bag door 12 is deployed from its closed position.

Because the stud head engagement surfaces 60a, 60b are flat rather than domed or ramped, the stud heads 52a, 52b are considerably more resistant to door opening than to door closing. Therefore, a greater amount of force is required to open the air bag door 12a, 12b than to close the air bag door. Sufficient opening force is supplied when, in response to air bag inflation, the air bag door 12a, 12b is forced to pivot out of the closed position and is pulled loose from the door hold-down member 24a, 24b and studs 48a, 48b.

In practice, the studs 48a, 48b are formed as a single unitary piece with, in the second embodiment, the hold-down member 24a, and in the third embodiment, the door substrate 34b. The studs 48a, 48b may, however, be formed separately. Studs formed separately may be connected to, in the second embodiment, the hold-down member 24a, and in the third embodiment, the door substrate 34b, using any one of a number of different structures and methods known in the art.

The shaft portion 50a, 50b of each stud 48a, 48b extends, in the second embodiment, outward from the hold-down member 24a in the direction of door opening, and, in the third embodiment, inward from the door substrate 34b opposite the direction of door opening. When the air bag door 12 is in the closed position, the shaft portions 50a, 50b extend through and are axially aligned with the fastener holes 38a (second embodiment) and 42b (third embodiment).

"Before the hold-down member 24a, 24b and air bag door 12a, 12b are assembled to the remainder of the inflatable restraint deployment system 10a, 10b the air bag door 12a, 12b is pivoted towards its closed position until, in the second embodiment, the first pair of fastener holes 38a contacts the stud flanges 52a and, in the third embodiment, until the second pair of fastener holes 42b contacts the stud flanges 52b. As the air bag door 12a, 12b continues towards its closed position, in the second embodiment, the first pair of fastener holes 38a is forced over the two stud flanges 52a and, in the third embodiment, the second pair of fastener holes 42b is forced over the two stud flanges 52b causing the stud flanges to yield and deform. As the air bag door 12a, 12b pivots into its closed position the stud flanges 52a, 52b return to their approximate pre-deformation configuration, securing the door 12a, 12b in its closed position against the hold-down member flange 26a, 26b. Once the hold-down member flange 26a, 26b is secured to the door substrate 34a, 34b the hold-down member flange 26a, 26b is attached to the canister 20a, 20b."

In other embodiments, the stud flanges 52a, 52b may be formed after the shaft portions 50a, 50b are inserted through the fastener holes. Where the studs are made of plastic, this may be accomplished by heat staking.

This is an illustrative description of the invention using words of description rather than of limitation. Obviously, many modifications and variations of this invention are possible in light of the above teachings. Within the scope of the claims one may practice the invention other than as described.

We claim:

1. An inflatable restraint deployment system comprising a simplified hold-down assembly for fastening an air bag door of said inflatable restraint deployment system in a tamper-proof closed position, said deployment system comprising:

an air bag container comprising an open end adjacent an air bag deployment opening;

said air bag door having a hinged edge pivotally supported adjacent said air bag deployment opening, said air bag door pivotally moveable about said hinged edge between a closed tamper-proof position covering said air bag deployment opening and an open air bag release position exposing said air bag deployment opening;

an elongated door hold-down member supported in a fixed position at one end thereof and having a flange at a second end thereof;

a fastener hole rim in one of said air bag door and said hold-down member flange, said fastener hole rim defining a fastener hole; and a door hold-down stud fastener integrally molded into the other of the air bag door and the hold-down member flange and including a fastener base engaging the other of said air bag door and said hold-down member, a shaft portion integrally extending from said fastener base through said fastener hole in a direction generally parallel to the direction said door initially moves when forced out of said closed position, a first fastener flange extending outward from around said shaft portion and engaging said fastener hole rim to hold said air bag door in said closed position, and a first fastener cross-sectional area defined by the intersection of said door hold-down stud fastener and a plane extending perpendicular to said shaft portion through said first fastener flange;

said fastener hole having an area smaller than said first fastener cross-sectional area whereby at least one of said fastener hole rim and said first fastener flange yields as said air bag door opens in response to air bag deployment and wherein one of said fastener hole rim and said first fastener flange reversibly yields upon engagement of said fastener flange with said fastener hole rim.

2. An inflatable restraint deployment system as defined in claim 1, in which said door hold-down stud fastener integrally extends from said air bag door.

3. An inflatable restraint deployment system as defined in claim 2 in which said air bag door includes a door substrate and in which said stud fastener is formed with said air bag door substrate as a single unitary piece.

4. An inflatable restraint deployment system as defined in claim 3 in which said air bag door substrate is made of plastic.

5. An inflatable restraint deployment system as defined in claim 1 in which said first fastener flange comprises a yielding stud head.

6. An inflatable restraint deployment system as defined in claim 1, in which said door hold-down stud fastener integrally extends from said door hold-down member.

7. An inflatable restraint deployment system as defined in claim 6 in which said stud fastener is formed with said hold-down member as a single unitary piece.

* * * * *